June 8, 1926.
A. G. REED
1,588,050
ENDLESS BELT AND METHOD OF MANUFACTURING SAME
Filed Jan. 11, 1923
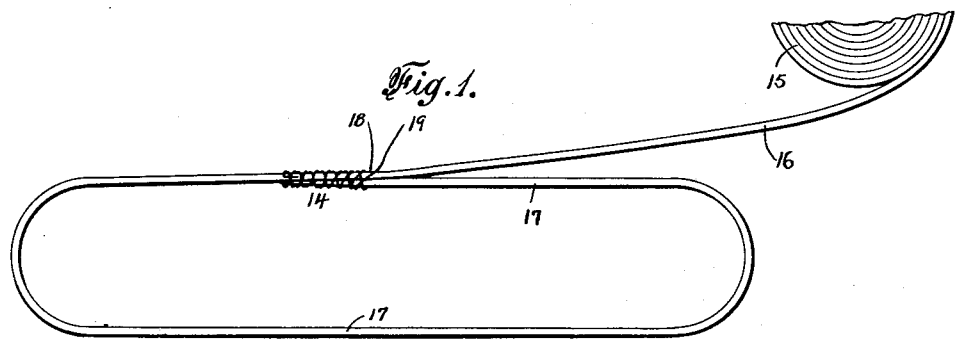
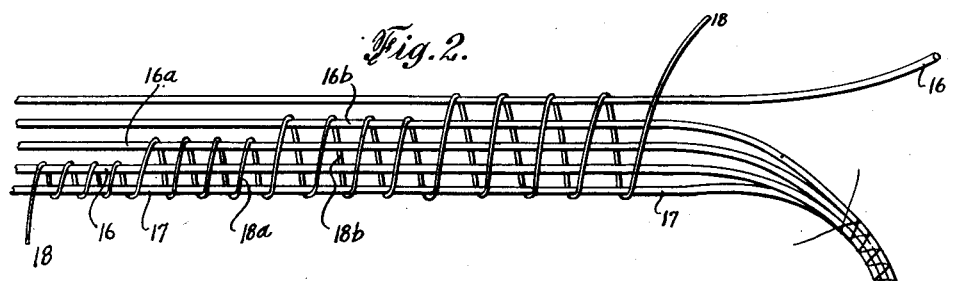
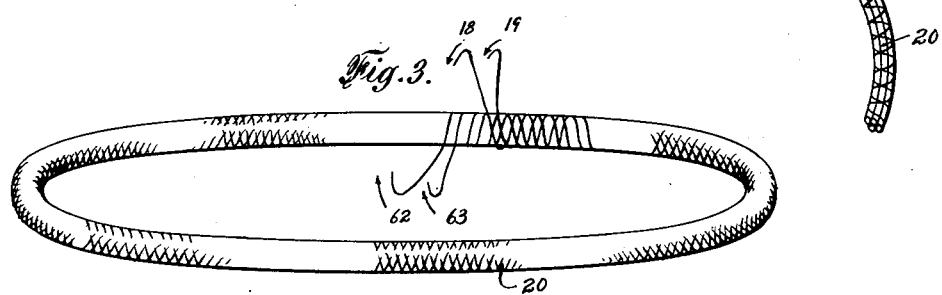
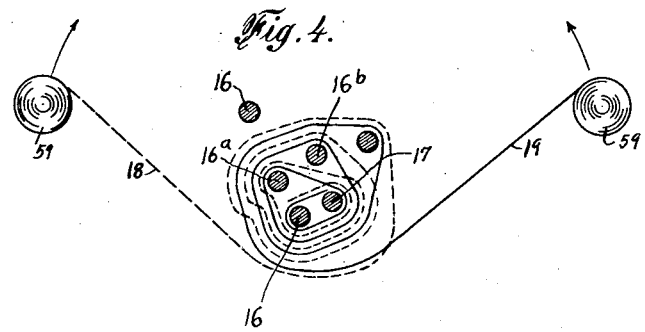
Inventor
Albert G. Reed
By his Attorney Patented June 8, 1926.

1,588,050

UNITED STATES PATENT OFFICE.

ALBERT G. REED, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT.

ENDLESS BELT AND METHOD OF MANUFACTURING SAME.

Application filed January 11, 1923. Serial No. 611,987.

This invention relates to cordage or cordage like products such as belts, ropes and the like; and a manufacturing method for making a cordage or cordage-like products.

An object of my invention is to produce a cordage structure comprising longitudinal or lengthwise strands or body members of fibrous materials, built up or juxtaposed with one another with binders of thread or other fibrous material wound on the strands or body members to form a solid structure of any desired firmness.

A further object is to provide a structure of this character in an endless belt form of any desired length and further to provide either a rope or belt like structure or endless belt, in which the outer strands may be of a desired increased length over the inner strands to thereby cause an even distribution of the strain throughout the cross-section of the structure in use in passing over a curved pulley for example, thereby avoiding a greater strain of the outside portion of the cordage or belt as would otherwise occur.

A further object of the invention is to provide an improved method of manufacturing structures of the characteristics indicated, capable of other applications as may appear to those skilled in the art, including a method of applying one longitudinal strand or body member of a fibrous material in juxtaposition with respect to another and binding the same by suitable binders; to form a built up cordage by lapping one strand upon another, which may be fed from the same source and binding each strand in position as the same is applied in building up the completed cordage or belt like structure, further objects being to provide a method of making a built up structure in which the binder threads may be interlaced or intercrossed if desired to materially add to the strength and compactness of the completed product.

A further object is to provide a method in which the tension of the binder may be regulated to thereby produce a harder or softer completed structure as may be desired.

A further object is to provide a method of making an endless belt as heretofore indicated as well as to make a cordage like rope of any desired length but having the usual ends if the same be desired.

It is also a feature of the present invention to produce structures of the character herein indicated and treat the same with a suitable sizing, gum, rubber or other suitable preparation and if desired to thereafter vulcanize the product to produce a water proof structure which will not shrink when exposed to atmospheric conditions or other changes in use tending to deteriorate the product.

A still further object is to provide a structure of this character in an endless belt in which the several strands may be arranged substantially parallel to avoid intercrossing of the main body strands which in such structure tends to stretch one strand over the other and weaken the belt in use.

A still further object is to provide a structure of this character in an endless belt in which the several strands and/or binders may be impregnated with a protective or rubber composition or in which the impregnation may be made either during manufacture or after the belt is completed.

Figures 1 to 4 inclusive show the construction of the belt and cordage products, Figures 2 and 4 being in a manner diagrammatic of the principles involved. Figure 1 illustrates the beginning of the belt in its early stages of manufacture and shows the source of the feed strand as delivered from a spool carrying a large supply of the material. Figure 2 illustrates a portion of a completed belt with the binder threads partly unwound to separate the fabricated or laminated lengthwise parallel strand structure. Figure 3 shows a completed endless belt with the reverse cross-winding binder threads in pairs partly unwound from the belt body. Figure 4 shows a diagrammatic cross sectional view of the belt greatly enlarged for the purpose of correctly disclosing the principle of the spirally and continuously wound fabricated and stranded cordage structure.

Referring now more particularly to the drawings for a detailed description of the endless belt and cordage products made in accordance with my invention, there is shown a feed strand spool 15 carrying enough thread or stranded material to feed the belt making machine; and a strand 16 feeds from the spool and is made in the form of a loop 17 by doubling the strand upon itself a length equal to the required length of the belt to be manufactured, and the loop 17 is tied at 14 by oppositely wound binder threads 18 and 19. This loop 17 is carried on pulleys of the belt making machine which causes the loop 17 to feed forwardly through the machine, automatically applying the feed cord 16 and binder threads 18 and 19 until a fabricated or laminated belt 20 is completed. A feed strand or lengthwise tension member 16 and binder threads 18 and 19 are successively fed upon or applied to the structure being built up until the required diametrical size or thickness of belt or cordage structure is secured.

In the diagrammatic views Figures 2 and 4, the belt or finished cordage product is broken apart or loosened up to illustrate the particular manner of building up the product by the successive or alternate application of lengthwise strands and binder threads. It is to be observed that the Figure 2 diagram, for comprehensiveness, illustrates one binder thread as 18 applied in a manner to first wrap one strand 16 upon the loop 17, and when the loop 17 has been traversed throughout its circumferential length, another feed strand 16ª is extended or applied parallel to the previously wrapped structure and thereupon the said binder thread wraps or envelops, as indicated at 18ª, the strand 16ª to tightly bind it in position; and similarly the binder thread portion 18ᵇ wraps the next lengthwise tension strand 16ᵇ and is continued throughout a successive number of times until the structure embodies a plurality of parallel tension strands 16 tightly bound upon the wrapped structure to produce the final belt or cord 20.

In the cross section diagram Figure 4, the respective lengthwise strands and spiral binder threads are spread apart to illustrate the substantially spiral and continuous manner of winding, in opposite directions, of the binder threads 18 and 19 upon the successively applied strands 16. In this view the binder threads 18 and 19 are first tied or secured to the innermost strands, 16 and 17, and the said binder threads are given at least one turn or wrap thereabout, whereupon the next strand 16ª, one or more, is placed in position and immediately followed by another reversed and criss-crossed wrapping or turn of the said binder threads; and this method of procedure is alternately pursued by lengthwise strand and spiral thread applications until the product has acquired the desired thickness or diameter. To clearly show the structure in this view one binder thread is dotted and winds around the belt in the reverse direction to the other binder.

The binder threads 18—19 and 62—63 are preferably run in pairs, as will be observed in Figure 3; and one set of binder threads is applied slightly ahead of the other pair in such a manner that the result is an oppositely wound criss-crossed and interwound or interlaced fabricated thread structure possessing a final winding of circumferential binder threads.

It is to be observed that my belt or cordage product is composed of strands preferably disposed parallel to the line of tension or strain to which the cord is subjected rather than being laid in a plaited, braided, or twisted manner as some types of belts. The plaiting or braiding of the lengthwise strands upon a central straight member or core imposes a large part of the strain upon the core which either stretches or breaks the core and weakens the belt, and to avoid this objection my improved belt structure is composed of substantially parallel strands with the plaited or braided structure over a core eliminated which avoids the possibility of angular or crosswise plaited thread portions becoming straightened out thus lengthening the belt in case the core breaks. Furthermore, in addition to the parallel longitudinal strands, I employ only circumferential binder threads so tightly applied that the stretch, if there be any in the lengthwise members, is pressed or forced out ahead of the winding binder threads because of the fact that the rapidly rotating binder threads so compress the strands that they are divided into a plurality of tightly bound short sections the length of which is defined by the distance between the binder thread, the said distance itself being regulated by the pitch or the lead of the binder thread; and therefore the resulting structure consists of a fabricated member bound both lengthwise and spirally, from end to end of the belt and from the inner center strands to the outer strands, and this construction is of such character that strain which might otherwise stretch an unbound member of considerable length fails to do so in this case because of the fact that the strain is so distributed to the many tightly bound sub-divisions throughout the length of the belt that the imposed load or strain does not materially stretch the belt. In other words, the material is so tightly bound that the finished product is very dense and compact in cross section which insures against lengthwise change and makes a serviceable belt.

As stated the thread or textile cordage products, such as belts, ropes, and the like, the finished product may be vulcanized, rubberized, or otherwise impregnated by hand or by any suitable means with moisture-proof preserving materials to make a durable belt or product. In fact, as will be understood by those conversant with the art, the completed belt or product 20, may be constructed of previously vulcanized or impregnated strands 16 and binders 18 if desired, but it is preferable to use soft untreated strands and thread in building up the product in order that the component parts may be tightly compressed into a minimum space by the thread binders which are tautly applied by the machine as will be hereinafter described, thus producing a hard yet flexible and pliable belt or rope product which is unlikely to stretch or contract when made into automobile belts, rope, rigging, netting and the like.

The method of building up the belt and the operation of the machine is such that the successively applied longitudinal strands are laid one upon the other substantially as shown in Figure 4 so that each successive strand is applied on the outer circumference or outer belt line with the result that the outer belt portions are longer than the inner belt portions by the difference in the circumference of the outer and inner belt circle. This construction equalizes the load carried by the belt because the inside strands as well as the outside strands are under equal tension and do equal work, and this is one of the particulars among others, which distinguishes and improves my belt over others, for in leather belts, and in braided and plaited material, the inside belt line and portion does not carry an equal part of the load along with the outside thereof due to the fact that the inside and outside are about equal in length and when coiled into belt form the inner circumferential portion is under compression and the outer portion is under tension. My belt overcomes the above mentioned objections and produces a belt not susceptible to stretching.

I claim:

1. A cordage like structure comprising a series of lengthwise filamentary members of fibrous material, binding material wrapped around said members to form a strand, other filamentary members positioned along said first mentioned filamentary members, and binding material wrapped around said last mentioned filamentary members and strand.

2. A built up belt like structure comprising a plurality of lengthwise sections of fibrous body material, binding material wrapped around certain sections of said body material and binding material wrapped around said bound body sections, and other of said body sections of said built up fabric belt like structure.

3. An endless belt comprising longitudinal strands of increasing circumferential length from the inner belt circle to the outer belt circle and binders separately joining sections of said strands and other strands together.

4. An endless belt composed of a single piece of strand material sufficiently long to build up a plural lengthwise stranded structure, said single strand formed into a number of substantially circular strands, the inner strands made shorter than the outer strands, and securing means to hold together both sections of and all the strands in a compact structure.

5. An endless fabric belt like structure comprising a plurality of endless body sections of fibrous material the length of each section increasing from the inside to the outside of the built up belt like structure, and a binding material wrapped around some of said sections to bind said sections together, and a binding material wrapped around said bound sections and other sections of said endless fabric belt like structure.

6. An endless fabric belt like structure comprising a plurality of endless body sections of fibrous material the length of each section increasing from the inside to the outside of the built up belt like structure, and a binding material wrapped around the inner sections to bind said sections together, and a binding material wrapped around said inner sections and other outer sections with respect to said inner sections.

7. An endless fabric belt like structure comprising a plurality of endless body sections of fibrous material the length of each section increasing from the inside to the outside of the built up belt like structure, and a binding material wrapped around the inner sections to bind said sections together, and a binding material wrapped around said inner sections and other outer sections with respect to said inner sections, and external binders surrounding all the lengthwise body members.

8. A cord comprising a series of strands, binding thread wrapped around the first of the series, another strand placed alongside the first series of bound strands, and binding thread wrapped around the last-named strand and the first named wrapped series.

9. Cordage structure comprising a plurality of adjacent parallel strands, binding threads wrapped around the plurality of strands forming a cord, additional parallel strand portions applied to the cord, and another binding thread wrapped around the cord and additionally applied strand portions.

10. Endless cordage; comprising a belt composed of first, a base of two parallel strands; second, thread binders applied to the base; third, another parallel strand disposed upon the secondly named structure; and fourth, another thread binder wound upon the thirdly named structure.

11. A cordage structure comprising a number of contiguous strands forming a lengthwise tension member, binding threads wound tautly around the tension member to produce substantial body density forming a hard cord, additional strands applied to the bound hard cord to enlarge and strengthen it, and additional binding thread wound upon the enlarged and strengthened hard cord to maintain constant the said substantial body density and hardness as the cord increases in size.

12. A cordage structure comprising a number of lengthwise flexible tension strands, an enveloping thread binding the tension strands under compression to compact the strands into a cord possessing substantial body density to produce hard cord, additional strands applied to the cord to increase the cord diameter and tensile strength, and additional enveloping binding thread applied to the cord and to the additional strands to maintain constant the body density of the cord as its diameter increases.

13. A cordage structure for rope, belts, and the like comprising a number of lengthwise tension strands, a number of enveloping binder threads wound in opposite directions around the strands, additional tension strands portions applied to the oppositely wound and bound structure, and additional binder thread portions wrapped in opposite direction around the first bound strands and applied strand portions.

14. A cordage structure for rope, belts, and the like comprising a number of lengthwise tension strands, a number of enveloping binder threads wound in opposite directions around the strands and crossed one over the other, additional tension strand portions applied to the oppositely wound and bound structure, and additional binder thread portions wrapped in opposite directions and crossed one over the other around the first bound strands and applied strand portions.

15. A cordage structure comprising parallel lengthwise tension strands, enveloping binder threads wound around the strands, additional tension strands applied parallel to the enveloped strands, and additional binder threads wound in opposite direction around the applied parallel strands and first named enveloped strands producing a structure in which all lengthwise strands run in parallelism.

16. A cordage structure comprising parallel lengthwise tension strands, enveloping binder threads wound around the strands, additional tension strands applied parallel to the enveloped strands, and additional binder threads wound in opposite direction and criss-crossing over each other around the applied parallel strands and first named enveloped strands producing a structure in which all lengthwise strands run in parallelism.

17. Endless cordage comprising a feed strand looped with its end fastened on the said strand to form a belt, a binding thread wound around the said fastened end continuing throughout the length of the belt to bind together the feed strand and belt, said feed strand successively extended lengthwise around the bound structure, and a binding thread wound upon the previously bound structure and feed strand each successive time the feed strand is extended around the belt.

18. Endless cordage comprising a belt composed of a plurality of lengthwise parallel strands successively bound together by spiral binders advancing along the belt, said spiral binders being applied to the successively disposed lengthwise strands producing a fabricated structure.

19. A fabricated structure for ropes, belting, cordage and the like, comprising a plurality of longitudinal parallel adjacent tension strands, binding thread wound around a portion of the center strands and advancing lengthwise the structure, the said binding thread thereafter successively made to endlessly include and draw inwardly additional tension strands of the aforesaid plurality and advancing lengthwise the structure, the said strands and binding thread being successively applied in layers a suitable number of times to produce the required size structure.

20. A fabricated cordage having central body stands, binding threads wound in opposite directions around the strands to produce a dense compact center, additional layers of strands applied to the said binding thread wound spirally outwardly from the center to envelop the added layers which is successively repeated to produce a laminated cord structure with spiral bindings.

21. A method in the art of manufacturing cordage products which consists in winding binders around a plurality of body members of strands, disposing additional strands upon the wound structure, and again winding a binder upon the additional strands producing a cord possessing compact body density.

22. That method of making cordage like structures which includes supporting a lengthwise body member as a base, applying a strand of body material thereto, securing the material and base together, and successively applying strands of body material to the cordage and binding the same together.

23. A method of making a built up belt like structure comprising, providing a plurality of lengthwise sections of fibrous body material, wrapping a binding material around certain sections of said body material and wrapping a binding material around said bound body sections and additional lengths of fibrous material to form said built up fabric belt like structure.

24. A method of making an endless fabric belt like structure comprising looping an endless body section of fibrous material of increased length with another, binding said sections, applying additional sections, the length of each section increasing from the inside to the outside of the built up belt like structure, and wrapping the binding material around the inner sections, and the other outer sections to join the same to said inner sections.

25. That improvement in the method of producing endless belts and the like which consists in employing a feed strand looped to form a belt and lapping the feed strand around the belt, the application of a number of oppositely running binder threads wound around the looped and lapped parts, running the binder threads around the belt in a manner to cause the binders to cross each other to form an interlaced binding, the parallel application of successive feet strands, and the application of the interlacing binders upon each successive feed strand.

26. An endless belt composed of a single piece of strand material sufficiently long to build up a plural lengthwise stranded structure, said single strand formed into a number of substantially circular strands, the inner strands made shorter than the outer strands, and binder cord wrapped around the inner strands and progressively wound around the outer strands.

27. That method of making belts which includes employing a loop as a belt base, applying a strand of material thereto, securing the material and base together, the successive application of strands of increasing length upon the outer circumference of the structure, and successively anchoring each strand of increased length to the structure.

28. That method of making belts which includes using a loop as a base, applying strands around the loop with each successive strand laid on the outer belt circumference, and the binding of the successive outer strands to the base.

29. A cordage like structure comprising a series of lengthwise body members of fibrous material, binding material wrapped around said members, other body members located along said first mentioned body members, and binding material wrapped around said last mentioned body members, said structure being impregnated with a protective cohesive substance.

30. An endless belt composed of a single piece of strand material sufficiently long to build up a plural lengthwise stranded structure, said single strand formed into a number of substantially circular strands, the inner strands made shorter than the outer strands, and securing means to hold together all the strands in a compact structure; said structure being impregnated with a protective cohesive substance.

31. An endless fabric belt like structure comprising a plurality of endless body sections of fibrous material the length of the sections increasing from the innermost to the outermost section and binding material wrapped around said sections to bind said sections together and form said endless belt like structure, said structure being impregnated with a vulcanized rubber substance.

32. An endless fabric belt like structure comprising a plurality of substantially parallel endless body sections of fibrous material the length of the sections increasing from the innermost to the outermost section and binding material wrapped around said sections to bind said sections together and form said endless belt like structure, said parallel body sections being impregnated with a vulcanized rubber composition.

33. A method of making a cordage like structure comprising laying series of lengthwise body members of fibrous material, wrapping a binding material around said members, impregnating said structure with a protective cohesive substance, laying other body members along said first mentioned body members, impregnating the same and wrapping a binding material around said last mentioned and first mentioned body members, and impregnating the completed structure.

34. A method of making a built up belt like structure comprising providing a plurality of lengthwise sections of fibrous body material, binding a material around certain sections of said body material and binding material around other of said bound body sections, and other of said body sections of said built up fabric belt like structure, and impregnating the same with a vulcanizable rubber composition and vulcanizing the same.

In testimony whereof, I affix my signature.

ALBERT G. REED.